Nov. 25, 1924.

J. BURNAND 1,517,191

INTERNAL COMBUSTION ENGINE

Filed May 22, 1922  6 Sheets-Sheet 1

Inventor
John Burnand
By
Attorney

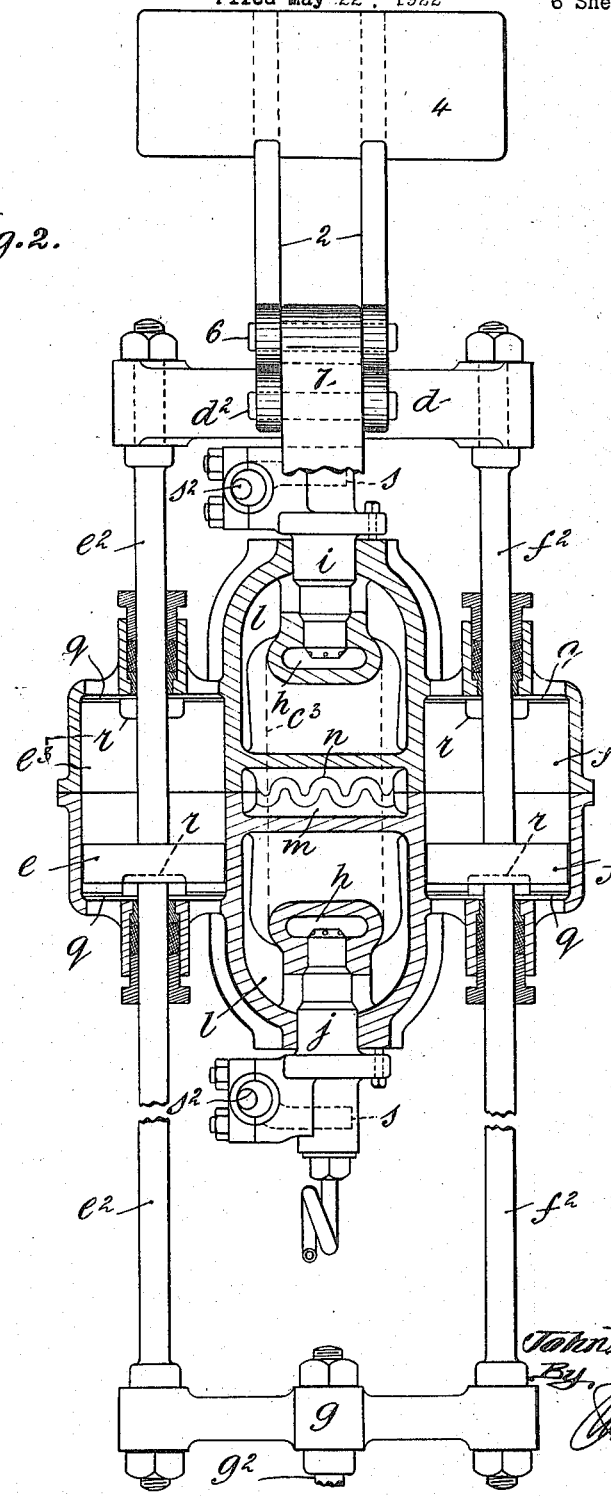

Nov. 25, 1924.                                             1,517,191
J. BURNAND
INTERNAL COMBUSTION ENGINE
Filed May 22, 1922          6 Sheets-Sheet 3

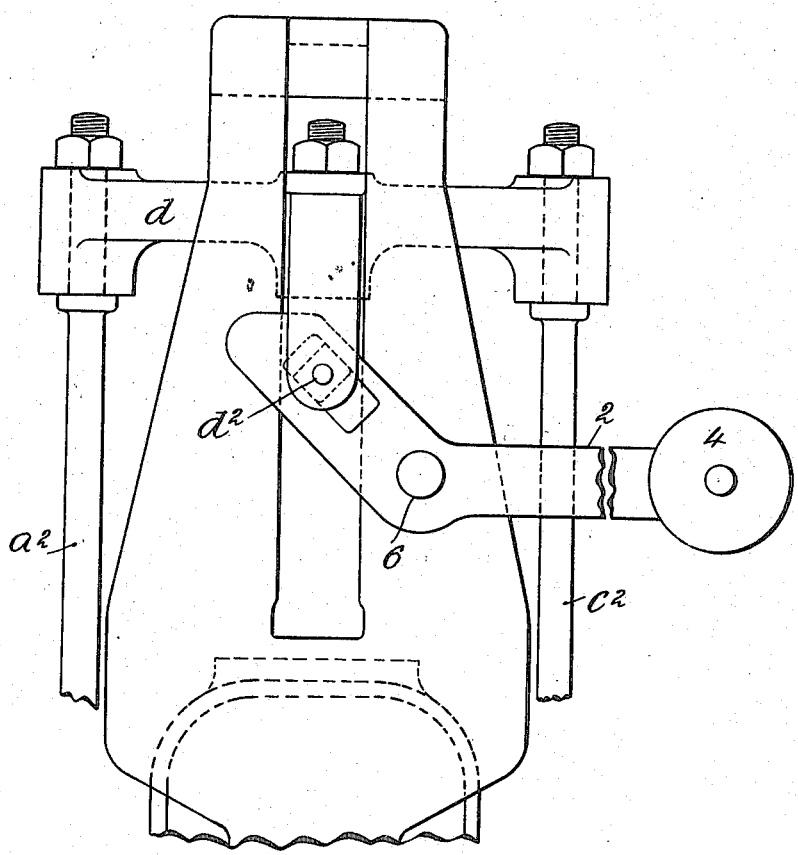

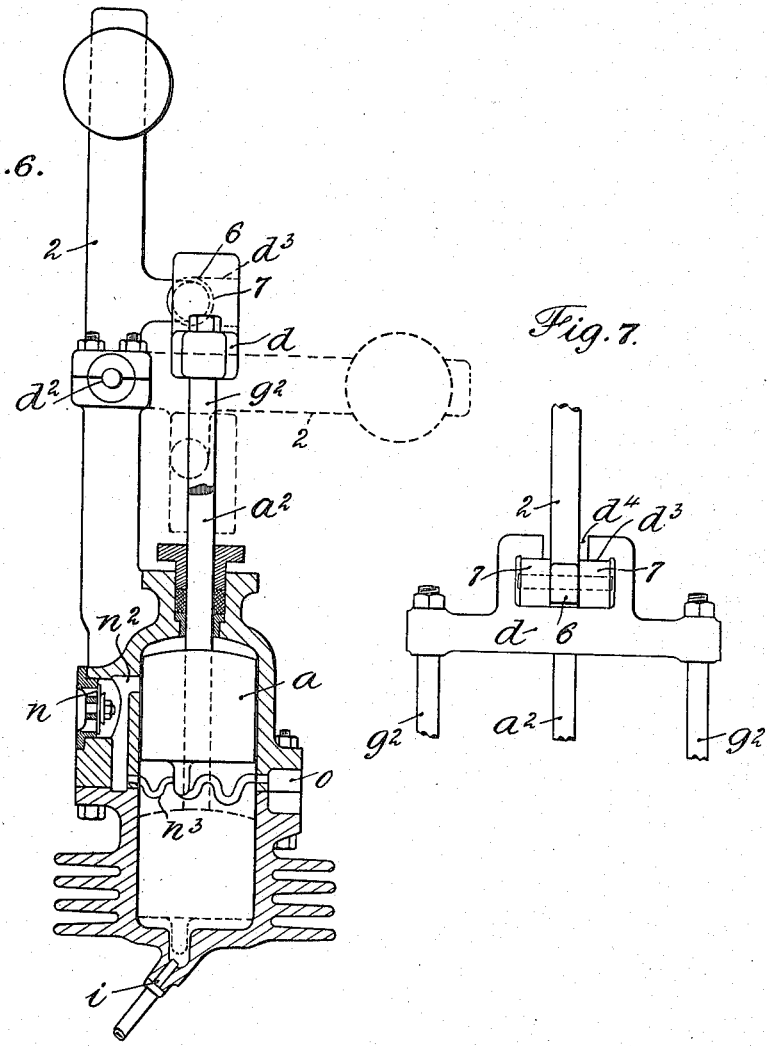

Nov. 25, 1924.
J. BURNAND
1,517,191
INTERNAL COMBUSTION ENGINE
Filed May 22, 1922    6 Sheets-Sheet 6
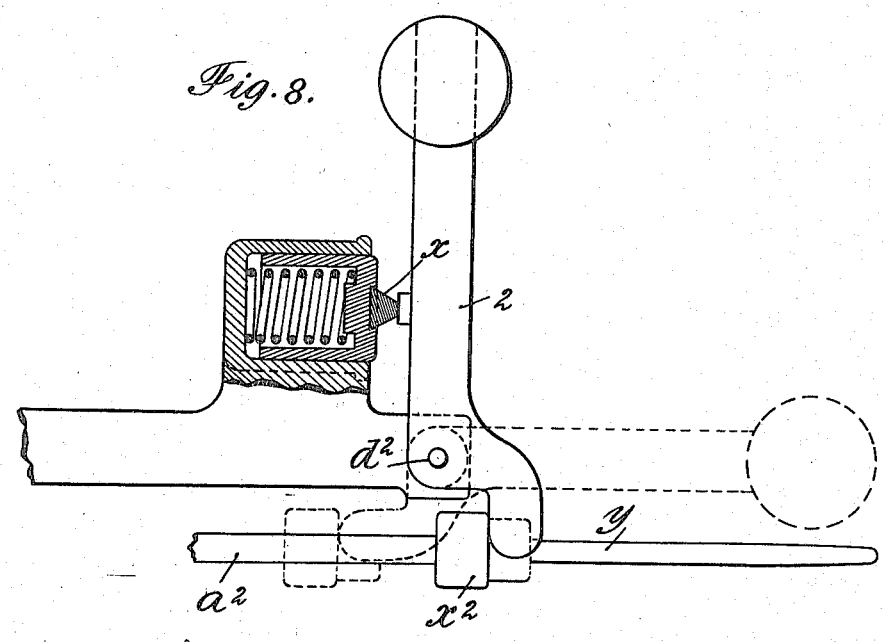

Patented Nov. 25, 1924.

1,517,191

UNITED STATES PATENT OFFICE.

JOHN BURNAND, OF TEDDINGTON, ENGLAND.

INTERNAL-COMBUSTION ENGINE.

Application filed May 22, 1922. Serial No. 562,744.

*To all whom it may concern:*

Be it known that I, JOHN BURNAND, subject of the King of Great Britain, residing at "Roseneath" 103, Cambridge Road, Teddington, Middlesex, England, have invented certain new and useful Improvements in and Connected with Internal-Combustion Engines, of which the following is a specification.

The invention relates to an internal combustion engine of the two-cycle type, and particularly to this type operating on the Diesel or semi-Diesel principle, although gas, petrol or other fuel may be used.

An engine according to the invention is without crank shaft, fly wheel and connecting rod, and employs in substitution therefor, and for general simplification and efficiency, one or more oscillating or swingable weights arranged and connected up to the power piston or pistons to co-act therewith so that a movement of one or more of said weights in any direction absorbs a sufficient amount of energy from the power stroke, at approximately the maximum period thereof, so as to be able to give out said energy for the compression of the next succeeding charge.

Such an engine is particularly suitable for driving a reciprocating pump or pumps, or air compressors, or power hammer, or such like.

Particularly the invention is applicable to a double-acting type of internal combustion engine as the power pistons compress charges on both sides, which charges have cushioning effects on the action of the weights as will be hereinafter made clear.

In this double acting type separate air pump pistons may be arranged to provide scavenging air and the air complement of the explosive charge, whereas in the case of single acting engines air pressure is also provided at the other end of the power piston for cushioning the action of the swingable weight or weights.

A desirable arrangement of engine according to the invention is one of the double-acting type in which the same swingable weights become operative for compression at both ends of the cylinder, but combined therewith is a straight-line moving weight to also absorb a sufficient amount of energy out of one power stroke to give said energy out for compression at the next succeeding power stroke.

The weight or weights and their operation are under the control of the power piston or pistons at one time and control said piston or pistons at another time, and their effective operation is intended to be the equivalent of the maximum compression pressure of the combustion charge, so that the amount of the compression pressure can be conveniently adjusted or regulated, while at the same time there is no dead action throughout the cycle of operations and no damage can arise from seizure of pistons or from pre-ignition.

The aforesaid essential features of the invention will be more clearly understood by the description hereinafter appearing with reference to the accompanying drawings which show two forms of engine of double-acting type and two forms of engine of single-acting type, all operating on the two-cycle principle.

Fig. 2 is a sectional elevation similar to Fig. 1 but looking at right-angles to Fig. 1.

Figure 1:
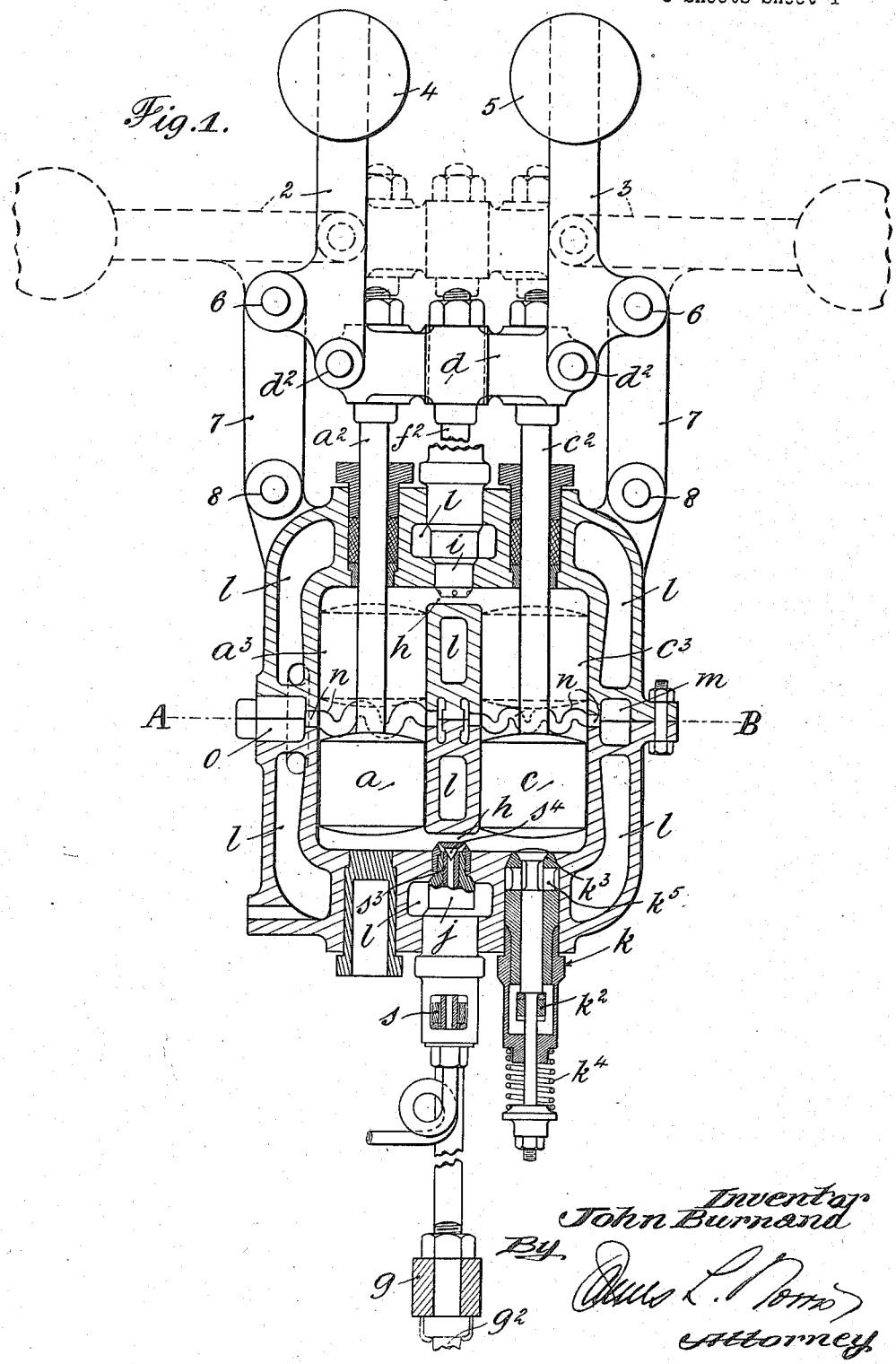
Fig. 1 is a sectional elevation of a double-acting type of internal combustion engine intended to operate upon the semi-Diesel principle, said engine being a vertical one and using two swingable weights.
Figure 4:
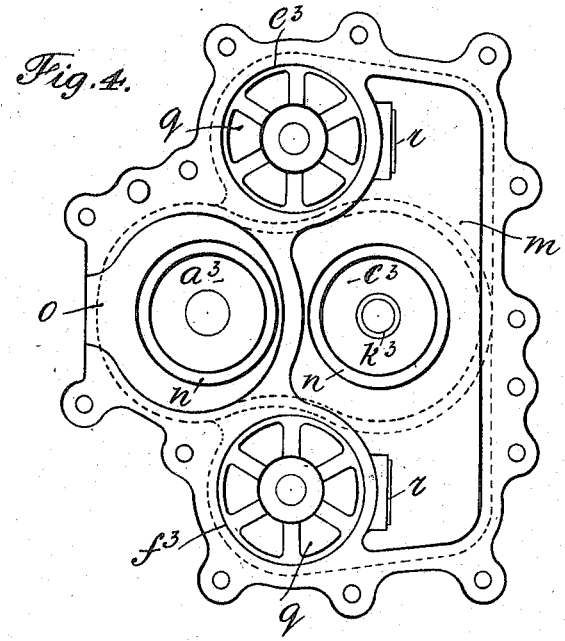
Figure 3:
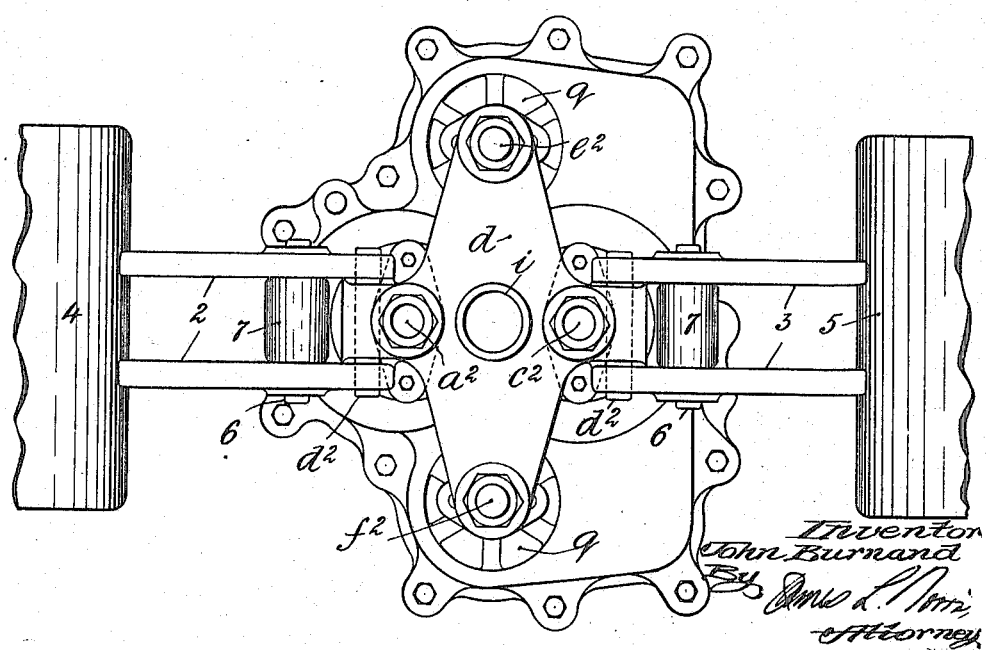
Fig. 3 is a plan of Fig. 1 but with the two oscillating weights which are shown in the dotted positions in Fig. 1 shown in the full positions.

Fig. 4 shows a plan through the engine casing on the line A. B. Fig. 1, the pistons being removed.

Fig. 5 shows by an elevation how the invention may be applied to a double-acting vertical engine by combining one swingable weight with a straight-line moving weight instead of combining two swingable weights.

Fig. 6 shows the invention applied to a single-acting vertical engine.

Fig. 7 is a detail of Fig. 6.

Fig. 8 shows how the invention is applied to a single acting horizontal engine.

In all the figures of the drawings the same letters of reference are used where permissible to indicate similar parts.

In the example Figs. 1 to 4 $a$ and $c$ are two double-acting power pistons rigidly connected by reciprocating rods $a^2$, $c^2$ to a common cross head $d$, which also has rigidly coupled to it the reciprocating rods $e^2$, $f^2$ of two air pump pistons $e$, $f$, which are double-acting and operate for the provision of scavenging air and for the provision of the air complement of the combustion charge. The rods $e^2$, $f^2$ of the air pump pistons extend from both sides of the pistons, and below are rigidly attached to the coupling member $g$, to which at $g^2$ a rod or other connecting piece is attached for driving a liquid or other pump or compressor or other part or object outside the engine itself.

The cylinders of the power pistons $a$ and $c$ are at $a^3$, $c^3$ and they communicate with each other at each end as shown at $h$. The cylinders of the air pistons are at $e^3$, $f^3$ and they form part of the same casing as the power clinders, which casing is illustrated as being formed in two main parts, upper and lower, joining up to each other at the facings indicated by the line A. B. Fig. 1.

$i$ and $j$ indicate fuel valves to the power cylinders. $k$ indicates a starting valve to said cylinders. $l$ indicates spaces in the casing for the circulation of cooling water, and $m$ indicates an air chamber having passages $n$ leading therefrom into, and from, the power cylinders to the exhaust outlet $o$, the operation of all of which parts will be hereinafter described with the general cycle of operations. A diaphragm inlet valve $q$ is provided at each end of the air pump cylinders $e^3$, $f^3$ and also at each of said ends a non-return flap valve $r$ leading from the air pump cylinders into the chamber $m$.

It is intended that the air pumps, aforesaid, shall provide in the air chamber $m$ a pressure of from twenty to thirty pounds absolute. The fuel valves $i$ and $j$ are mechanically operated, and the fuel is forced into the power cylinders at a high pressure, much greater than the ordinary compression pressure which may be conveniently stated to be three-hundred pounds to the square inch.

A lever $s$ rocking on a shaft $s^2$ is indicated for opening each fuel valve $i$ and $j$ by moving the sleeve $s^3$ from off the fixed cone $s^4$ against any suitable spring action for closing said valve. Similarly the starting valve $k$ is opened mechanically from a lever $k^2$ lifting the mushroom head $k^3$ off its seating against the action of the coiled spring $k^4$, $k^5$ indicating a chamber communicating with the compressed air supply used only for starting up. Intermediate of the length of each power cylinder $a^3$, $c^3$ is shown an undulating ring space providing the passages $n$. One ring space communicates from the air chamber $m$ to the cylinder $c^3$, and the other ring space from the cylinder $a^3$ to the exhaust outlet $o$, the scavenging taking place by the scavenging air blowing into the one power cylinder and through into the other and out at the other ring space to the exhaust, to subsequently leave an amount of air in both cylinders which is trapped by the power pistons and compressed to form the air complement of the combustion charge.

The foregoing in relation to the drawings forms no material part of the invention claimed, but only a convenient adaptation in the application of the invention which will now be described.

The cross head $d$ and the coupling member $g$ and the pistons and parts connected therewith constitute a weight in this vertical type of engine tending to move the power and pump pistons downwardly in their stationary cylinders.

To the cross head $d$ at $d^2$, $d^2$ are fulcrumed the one end of two rigidly built swingable levers 2 and 3 carrying weights 4 and 5 at their free ends. These swingable levers are each pivoted at 6 to the one end of a swingable link 7 whose other end is pivoted at 8 to a fixed part of the engine casing. The weighted levers 2 and 3 are therefore collectively moved at one time by the reciprocation of the power pistons and in turn exert their influence on said power pistons et cetera at another time, said levers swinging to two positions the one vertical as shown in full lines in Fig. 1 and the other horizontal as shown in full lines in Fig. 3 and in dotted lines in Fig. 1. Said levers on being moved in one direction absorb a sufficient amount of energy from the power stroke at approximately the maximum period thereof to give same out for the compression of the next succeeding charge; for example, assuming the parts in the positions illustrated by Fig. 1, the effective combustion within the lower ends of the power cylinders throws over the action of the weighted levers from vertical, as shown in the full lines, to beyond the dead line in swing, at the same time lifting the cross head $d$ and the coupling member $g$ and the parts moving therewith, absorbing for such purpose an amount of energy from the power stroke at approximately the maximum period thereof. Immediately the weighted levers move or throw over beyond their dead line in swing they automatically operate to lift the power pistons, et cetera, giving out for this purpose the energy stored up in them to ultimately cause the compression of the next succeeding charge within the upper ends of the cylinders, at which time said levers take up the horizontal positions as shown in the dotted lines in Fig. 1 and full lines in Fig. 3.

It will be seen from Fig. 1 that the ring passage $n$ is open to the air chamber $m$, and that the cylinder $c^3$ is open to the cylinder $a^3$, from which latter the ring passage $n$ proceeds to the exhaust $o$. Therefore before the upstroke of the power pistons commences the power cylinders at their upper ends are scavenged and during the upstroke of the power pistons the air complement of the combustion charge is trapped in the power cylinders and compressed, so that against the action of the weights 4 and 5 there is always at each end of the cylinders a resilient cushion due to compressing the air complement of the combustion charge. When combustion takes place at the upper ends of the power cylinders a portion of the energy of the power stroke at the maximum period is used to swing the weighted levers 2 and 3 from horizontal positions to beyond, or over, the dead line in swing of said levers, after which said weighted levers together with the cross head $d$ and coupling member $g$ and parts moving therewith exert a downward influence on the power pistons compressing the air complement of the combustion charge to maximum compression pressure, ready for firing.

In the example of the invention Fig. 5 a single oscillating or swingable weighted lever 2 is employed in combination with a straight-line moving weight, $d$, forming the cross head connecting the power and pump piston rods, but otherwise this example is only a modification of the figures previously described.

The weighted lever is fulcrumed at 6 to the stationary frame, is weighted at 4, and is coupled to the straight-line moving cross head, $d$, at $d^2$ by a slot and a bearing block sliding therein. In this example the swingable weighted lever 2 operates for compression on the upstroke, and the weighted cross-head for compression on the downstroke, each of these weights absorbing a sufficient amount of energy from power strokes at approximately the maximum period to ultimately give same out for the compression of the next succeeding charge in the particular order.

The example of the invention shown in Figs. 6 and 7 is a single acting vertical engine. $a$ is the power piston, 2 is the swingable weighted lever, and $d$ is the weighted cross head. The lever is fulcrumed at $d^2$ to a fixed part of the engine casing, and connects with the cross head at 6 by rollers 7 engaging a transverse gap $d^3$ in the cross head. The lever can swing through a gap $d^4$ at the upper end of the cross head without the rollers 7 ever becoming disconnected from the gap they engage. In this arrangement an air cushion is provided at the upper end of the cylinder in which the power piston works so that there is an automatic rebound action of the power piston from the upper end of its stroke tending to start the action of the weighted lever 2 from vertical position. This upper end of the cylinder also provides scavenging air under pressure and for the air complement of the combustion charge. For this purpose $n$ is a non-return air inlet valve admitting air into the upper portion of the cylinder as the piston makes its down-stroke after opening the inlet port $n^2$. On the upstroke the trapped air is compressed and forced through the lower part of the cylinder by the wavy passage $n^3$ leading to the exhaust $o$ to scavenge this end of the cylinder, and subsequently leave therein the air complement for the charge; it being clear that the passage $n^2$ is so arranged that cushioning air is always trapped within the upper end of the cylinder to prevent the weight throwing over too far and to assist in its return action from vertical position. In this example $i$ indicates the fuel inlet valve through which fuel is fed to the cylinder under pressure in any convenient manner.

The horizontal example of the invention Fig. 8 is substantially in accordance with the example Figs. 6 and 7 except that the weighted lever 2 has no permanent connection with the power piston rod $a^2$ and in addition operates against a yielding rebounding buffer $x$ fixed to the engine frame. The fulcrum of the lever 2 is at $d^2$ to the stationary frame and the arm of it contacting the power piston works loosely against a thrust collar $x^2$ fixed to the power piston rod. $y$ indicates a hammer drill driven by the straight-line moving power piston whose rod $a^2$ only is shown. The movement of the power piston in one direction lifts the weighted lever to the vertical throwing it against the buffer $x$, which instantly rebounds the lever to throw it over so that it becomes operative to move the power piston in the reverse direction compressing the combustion charge, so that herein an oscillating or swingable weight is arranged so that its movement in one direction absorbs a sufficient amount of energy of the power stroke at approximately the maximum period thereof to give same out for the compression of the next succeeding charge. The action within the power cylinder may be substantially in accordance with what has been described in connection with Fig. 6.

Apart from the absence of crank shaft, fly wheel and connecting rod the engine of the invention has other advantages. There is no dead centre, the first cost is low, there is less wear and tear on the reciprocating parts and on the cylinder walls, and no dangers can arise from seizure of piston or pre-ignition, all resulting in greater efficiency.

Having now described my invention what I claim and desire to secure by Letters Patent is:—

1. In an internal combustion engine of the two-cycle type, the combination with a vertically arranged cylinder and a piston reciprocable therein of means for absorbing energy from said piston at the beginning of the explosion stroke and returning it to said piston toward the end of said stroke, comprising a weight, an oscillatable lever upon which said weight is mounted, pivotally connected to said piston, a link pivotally secured to a fixed part of the engine and affording a fulcrum for said lever, said fulcrum being out of line with the weight and said point of connection, said lever having a position toward one limit of its range of oscillatory movement in which the weight is carried in a substantially vertical line with said point of connection, and a position at the other end of its range of oscillatory movement, on the opposite side of said fulcrum, the oscillatory movement of said weight in either direction being initiated by said piston and continued beyond the fulcrum of said lever by gravity.

2. An internal combustion engine having a vertically arranged cylinder, a piston and piston rod operable therein on the two-cycle principle, a link pivotally connected to said cylinder, a weighted lever pivotally connected both with the piston rod and to said link so as to be oscillated by the movement of said rod, said weighted lever being adapted to be brought into vertical and horizontal positions, the arrangement being such that when the said lever is in a vertical position the weight thereof will be almost entirely supported by said casing through said link.

3. An internal combustion engine having a vertically arranged cylinder casing, a piston and piston rod operable therein on the two-cycle principle, a weighted lever pivoted to the piston rod, a link pivotally connecting said lever to said casing, the arrangement being such that when the piston and rod are acting under approximately maximum force the lever will absorb energy and will perform work on said piston and rod during the compression stroke of the piston succeeding the power stroke.

4. In a two-cycle internal combustion engine having a vertically arranged cylinder and a piston and piston rod operable therein, said piston being power-driven in both its up and down stroke, weights associated with said rod and having rectilinear movement therewith, and a weight pivotally connected to said rod and having angular movement relative to its pivot point, said last named weight being also pivotally connected by a link with the cylinder casing, the weights being so arranged relative to the piston that energy is stored up at the periods of maximum energy of the piston in both directions of its movement respectively in the rectilinearally moving and the angularly moving weights and respectively used in the next succeeding compression of gas by said piston.

5. In a two-cycle internal combustion engine having a vertically arranged cylinder and a piston and piston rod operable therein, a weighted lever pivoted to the upper end of said rod, a link pivoted at its one end to said lever and at its other end to the cylinder casing, the arrangement of the link and related parts with the casing and piston rod being such that when the weighted lever is in vertical position its weight will be almost wholly sustained by said link and exert substantially no force on said piston rod.

In testimony whereof I have hereunto set my hand in presence of two subscribing witnesses.

JOHN BURNAND.

Witnesses:
GEO. T. FUERY,
JOHN P. FUERY.